United States Patent
Bao et al.

(10) Patent No.: US 10,123,196 B2
(45) Date of Patent: Nov. 6, 2018

(54) METHOD AND DEVICE FOR ALARM TRIGGERING

(71) Applicant: Xiaomi Inc., Beijing (CN)

(72) Inventors: Xiehao Bao, Beijing (CN); Xiaoping Zhao, Beijing (CN); Shiding Qiu, Beijing (CN)

(73) Assignee: Xiaomi Inc., Beijing (CN)

( * ) Notice: Subject to any disclaimer, the term of this patent is extended or adjusted under 35 U.S.C. 154(b) by 4 days.

(21) Appl. No.: 15/193,204

(22) Filed: Jun. 27, 2016

(65) Prior Publication Data
US 2016/0381540 A1    Dec. 29, 2016

(30) Foreign Application Priority Data
Jun. 29, 2015   (CN) .......................... 2015 1 0369984

(51) Int. Cl.
*G08B 1/08*    (2006.01)
*H04W 4/90*    (2018.01)
*G08B 25/01*   (2006.01)
*H04M 1/725*   (2006.01)

(52) U.S. Cl.
CPC ............ *H04W 4/90* (2018.02); *G08B 25/016* (2013.01); *H04M 1/72541* (2013.01); *H04M 1/72569* (2013.01)

(58) Field of Classification Search
CPC .. G06F 3/017; G08B 25/016; H04M 1/72541; H04M 1/72569; H04W 4/22
See application file for complete search history.

(56) References Cited

U.S. PATENT DOCUMENTS

| | | | |
|---|---|---|---|
| 2012/0003956 A1 | 1/2012 | Austin et al. | |
| 2014/0349603 A1* | 11/2014 | Waterhouse | H04M 1/72536 455/404.1 |
| 2015/0319294 A1* | 11/2015 | Sudhir | H04M 1/72541 455/411 |

FOREIGN PATENT DOCUMENTS

| | | |
|---|---|---|
| CN | 101175124 A | 5/2008 |
| CN | 102131143 A | 7/2011 |
| CN | 102883049 A | 1/2013 |
| CN | 102883053 A | 1/2013 |
| CN | 103338310 A | 10/2013 |
| CN | 103475777 A | 12/2013 |

(Continued)

OTHER PUBLICATIONS

International Search Report and Written Opinion for PCT/CN2015/095331, mailed from the State Intellectual Property Office of China dated Feb. 18, 2016.

(Continued)

*Primary Examiner* — Omeed Alizada
(74) *Attorney, Agent, or Firm* — Finnegan, Henderson, Farabow, Garrett & Dunner LLP

(57) ABSTRACT

The present disclosure relates to a method and a device for alarm triggering. The method includes: receiving a trigger instruction on a verification interface; determining whether the received trigger instruction is a predetermined alarm triggering instruction, the predetermined alarm triggering instruction corresponding to at least one contact person; entering an alarm triggering mode if the received trigger instruction is determined to be the predetermined alarm triggering instruction; and sending alarm information to a terminal of the at least one contact, the alarm information indicating that a user is in danger.

15 Claims, 10 Drawing Sheets

(56) References Cited

FOREIGN PATENT DOCUMENTS

| CN | 105120122 A | 12/2015 |
|----|-------------|---------|
| JP | 2001-177611 A | 6/2001 |
| JP | 2002-158754 A | 5/2002 |
| JP | 2002-183851 A | 6/2002 |
| JP | 2008-048082 A | 2/2008 |
| KR | 10-2008-0033804 A | 4/2008 |
| KR | 10-2009-0061784 A | 6/2009 |
| RU | 2335855 C2 | 10/2008 |
| RU | 141791 U1 | 6/2014 |

OTHER PUBLICATIONS

Extended European Search Report of European Patent Application No. 16176275.2, from the European Patent Office, dated Aug. 18, 2016.

"Panic Button (Beta)—Android Apps on Google Play," iilab, dated Apr. 20, 2015, URL: https://play.google.com/store/apps/details?id=org.iilab.pb&hl=en (retrieved on Aug. 9, 2016).

Office Action for Chinese Application No. 201510369984.5, mailed from the State Intellectual Property Office of the People's Republic of China, dated Jul. 28, 2017.

Korean Office Action issued in Korean Patent Application No. 10-2016-7028490, dated Mar. 8, 2018.

Japanese Office Action issued in Japanese Patent Application No. 2017-504139, dated Apr. 3, 2018.

\* cited by examiner

METHOD AND DEVICE FOR ALARM TRIGGERING

CROSS-REFERENCE TO RELATED APPLICATIONS

This application is based on and claims a priority to Chinese Patent Application No. 201510369984.5, filed Jun. 29, 2015, the entire contents of which are incorporated herein by reference.

TECHNICAL FIELD

The present disclosure relates to a field of mobile communication, and more particularly, to a method and device for alarm triggering.

BACKGROUND

With the development of the mobile communication technology, smart terminals such as mobile phones and tablet computers have become popular.

For example, most mobile phones can be used to send short messages and make calls. When its user encounters an emergency such as being threatened, the user may call to a contact, e.g., the police or a relative, for help. In the related art, when the user makes the call, the user searches a contact list for a phone number of the contact manually, or inputs the mobile phone number of the target contact into the mobile phone manually and uses a predetermined gesture start the call. When the mobile phone receives the call instruction, it tries to connect the contact, so that the user can seek for help.

SUMMARY

According to a first aspect of the present disclosure, there is provided a method for alarm triggering, implemented by a local terminal, comprising: receiving a trigger instruction on a verification interface; determining whether the received trigger instruction is a predetermined alarm triggering instruction, the predetermined alarm triggering instruction corresponding to at least one contact person; entering an alarm triggering mode if the received trigger instruction is determined to be the predetermined alarm triggering instruction; and sending alarm information to a terminal of the at least one contact, the alarm information indicating that a user is in danger.

According to a second aspect of the present disclosure, there is provided a device for alarm triggering, comprising: a processor; and a memory storing instructions executable by the processor, wherein the processor is configured to: receive a trigger instruction on a verification interface, determine whether the received trigger instruction is a predetermined alarm triggering instruction, the predetermined alarm triggering instruction corresponding to at least one contact person, enter an alarm triggering mode if the received trigger instruction is determined to be the predetermined alarm triggering instruction, and send alarm information to a terminal of the at least one contact, the alarm information indicating that a user is in danger.

According to a third aspect of the present disclosure, there is provided a non-transitory computer-readable storage medium storing instructions that, when executed by a processor of a terminal device, cause the terminal device to perform a method for alarm triggering, the method comprising: receiving a trigger instruction on a verification interface; determining whether the received trigger instruction is a predetermined alarm triggering instruction, the predetermined alarm triggering instruction corresponding to at least one contact person; entering an alarm triggering mode if the received trigger instruction is determined to be the predetermined alarm triggering instruction; and sending alarm information to a terminal of the at least one contact, the alarm information indicating that a user is in danger.

It is to be understood that both the foregoing general description and the following detailed description are exemplary and explanatory only and are not restrictive of the invention, as claimed.

BRIEF DESCRIPTION OF THE DRAWINGS

In order to describe embodiments of the present disclosure in detail, drawings used for describing embodiments will be referred as below. Obviously, the following drawings described are only some of embodiments of the present disclosure. The skilled in the art may obtain other drawings according to these drawings without any creative work.

FIG. 3-1 is a flow chart illustrating another method for alarm triggering, according to an exemplary embodiment of the present disclosure.

FIG. 3-2 is a flow chart illustrating another method for determining whether a trigger instruction is a predetermined alarm triggering instruction, according to an exemplary embodiment of the present disclosure.

FIG. 3-3 is a flow chart illustrating another method for alarm triggering, according to an exemplary embodiment of the present disclosure.

FIG. 3-4 is a flow chart illustrating another method for alarm triggering, according to an exemplary embodiment of the present disclosure.

FIG. 4 is a block diagram illustrating a device for alarm triggering, according to an exemplary embodiment of the present disclosure.

FIG. 5-1 is a block diagram illustrating another device for alarm triggering, according to an exemplary embodiment of the present disclosure.

FIG. 5-2 is a block diagram illustrating a trigger instruction determination module, according to an exemplary embodiment of the present disclosure.

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
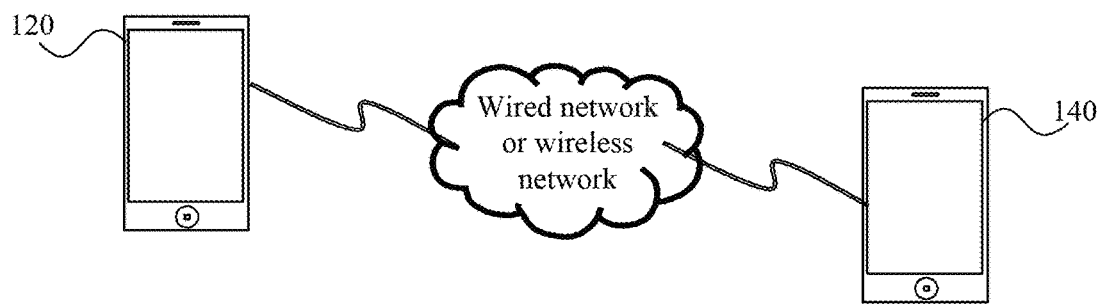
FIG. 1 is a schematic diagram illustrating a system for implementing a method of alarm triggering, according to an exemplary embodiment.

FIG. 1 is schematic diagram illustrating a system 100 for implementing a method of alarm triggering, according to an exemplary embodiment. The system 100 may include a first terminal 120 and a second terminal 140.

The first terminal 120 may be an electronic device configured to verify information and to trigger alarm, such as a smart phone and a tablet computer. The first terminal 120 may also be configured to send a short message and make a call. The first terminal 120 may trigger alarm by sending alarm information to the second terminal 140 via the short message or the call. In some embodiments, the first terminal 120 may include client terminals such as a microblog, a social application, and an email. The first terminal 120 may send the alarm information to the second terminal 140 via the client terminals installed on the first terminal 120, such as QQ, WeChat, LinkedIn, and MiTalk. In some embodiments, the first terminal 120 may be configured to capture images, capture videos, record voices, locate positions, generate alarm information, hide alarm information, and switch modes.

The first terminal 120 may be connected with the second terminal 140 via a wired network or a wireless network.

The second terminal 140 may be an electronic device receiving the alarm information sent from the first terminal 120, and may be a smart phone and a tablet computer. The second terminal 140 may be configured to send a start request for a predetermined function, such as a camera function, a video function, a locating function, and a recording function, to the first terminal 120. The first terminal 120 may start the predetermined function based on the request from the second terminal 140, collect corresponding data, and send the collected data to the second terminal 140.

In some embodiments, the first terminal 120 and the second terminal 140 may be exchangeable. That is, the first terminal 120 may have all functions of the second terminal 140, and the second terminal 140 may have all functions of the first terminal 120. The first terminal 120 and the second terminal 140 may also have each other's function. The first terminal 120 and the second terminal 140 may be the same or different.

Figure 2:
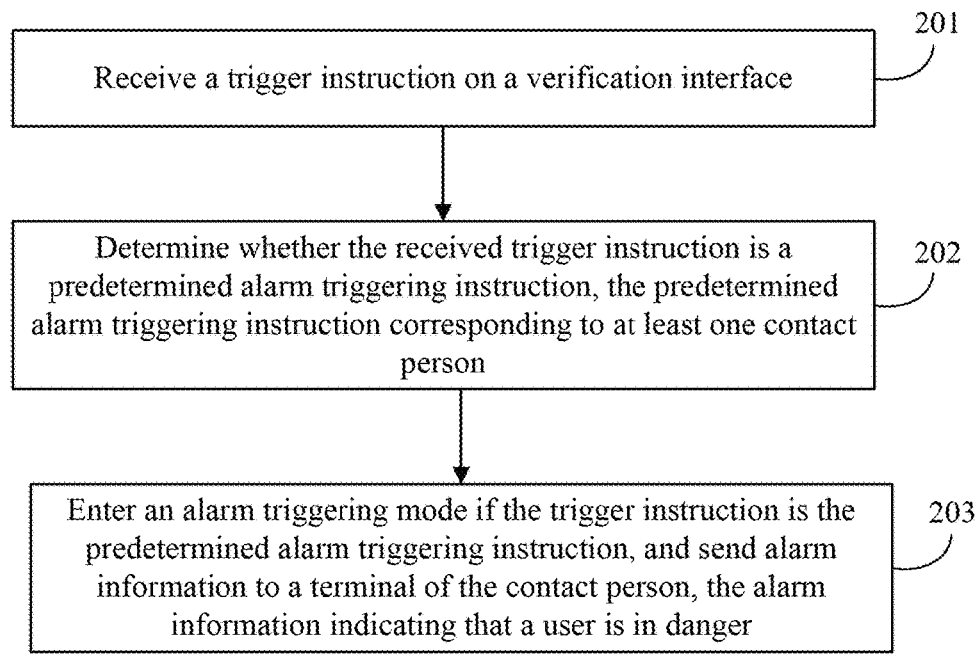
FIG. 2 is a flow chart illustrating a method for alarm triggering, according to an exemplary embodiment of the present disclosure.

FIG. 2 is a flow chart illustrating a method 200 for alarm triggering, according to an exemplary embodiment of the present disclosure. The method 200 may be implemented by the first terminal 120 which may be a local terminal and may include following steps.

At step 201, a trigger instruction is received on a verification interface.

At step 202, whether the received trigger instruction is a predetermined alarm triggering instruction is determined, the predetermined alarm triggering instruction corresponding to at least one contact person.

At step 203, an alarm triggering mode is entered if the trigger instruction is the predetermined alarm triggering instruction, and alarm information is sent to a terminal of the contact person, the alarm information indicating that a user, e.g., a user of the first terminal 120, is in danger.

In some embodiments, by sending the alarm information to the terminal of the contact if the received trigger instruction is the predetermined alarm triggering instruction, the complicated alarm triggering process described in the related art can be reduced to simplicity.

In some embodiment, the verification interface can be a lock screen. Step 201 may include receiving an unlocking instruction on the lock screen. Step 202 may further include: determining whether the received unlocking instruction matches with the predetermined alarm triggering instruction; and determining that the trigger instruction is the predetermined alarm triggering instruction, if the received unlocking instruction matches with the predetermined alarm triggering instruction.

In some embodiments, the method 200 may further include: turning a local terminal, e.g., the first terminal 120, into a silent mode, the silent mode including at least one of a mute mode or a lock-screen mode.

In some embodiments, the method 200 may further include: maintaining the silent mode if receiving a communication message from another terminal; and sending the alarm information to the another terminal.

In some embodiments, the method 200 may further include: hiding at least one of the alarm information or alarm reply information, in which the alarm reply information replies based on the alarm information after the alarm information is received by the terminal of the at least one contact.

In some embodiments, the method 200 may further include: receiving a request for starting a predetermined function from the terminal of the at least one contact, the predetermined function including: at least one of capturing an image, capturing a video, locating a position, or recording a voice; starting the predetermined function of a local terminal, e.g., the first terminal 120, according to the received request; sending data collected according to the predetermined function to the terminal of the at least one contact.

In some embodiments, the method 200 may further include: receiving a cancellation instruction on the verification interface; determining whether the cancellation instruction is a predetermined alarm cancellation instruction related to the predetermined alarm triggering instruction; exiting the alarm triggering mode if the cancellation instruction is the predetermined alarm cancellation instruction.

In some embodiments, in step 203, sending the alarm information to the terminal of the at least one contact may include at least one of: sending a short message including the alarm information to the terminal of the at least one contact; placing a call to the terminal of the at least one contact to play the alarm information to the terminal, if the call is picked up; or sending the alarm information to the terminal of the at least one contact via a client terminal on the local terminal, e.g., the first terminal 120, the client terminal including at least one of a microblog, a social application, or an email application.

In some embodiments, in step 203, sending the alarm information to a terminal of the at least one contact may include: sending the alarm information to the terminal of the at least one contact at a predetermined time interval, the alarm information including information indicating a dangerous situation of the user and current position information of the user.

As described, the trigger instruction can be received on the verification interface, an alarm triggering mode can be entered if the trigger instruction is the predetermined alarm triggering instruction, and the alarm information can be sent to the terminal of the at least one contact. By sending the alarm information to the terminal when the trigger instruction is the predetermined alarm triggering instruction, the complicated alarm triggering process described in the related art can be reduced to simplicity.

Figures 1, 3:
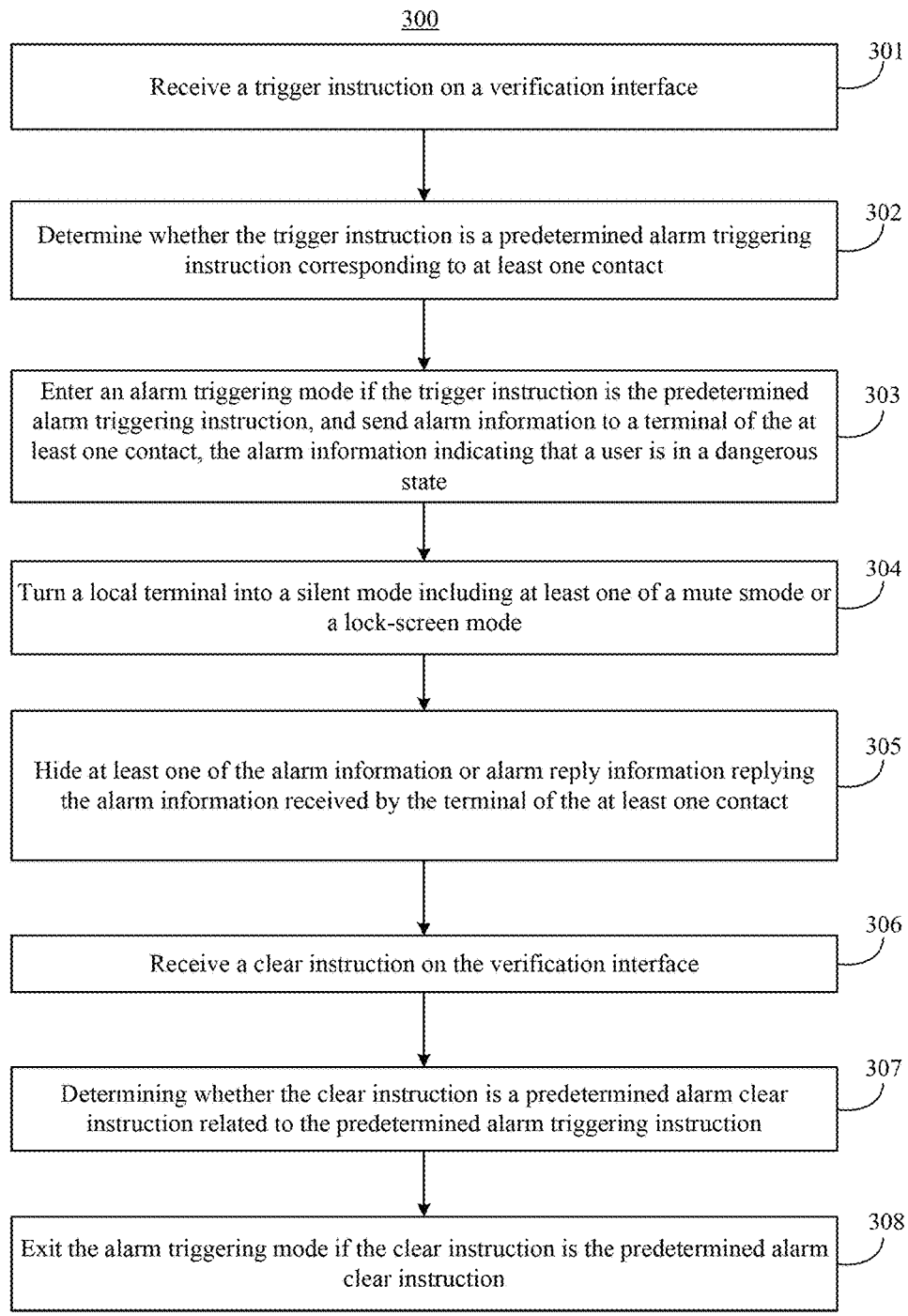
Figures 2, 3:
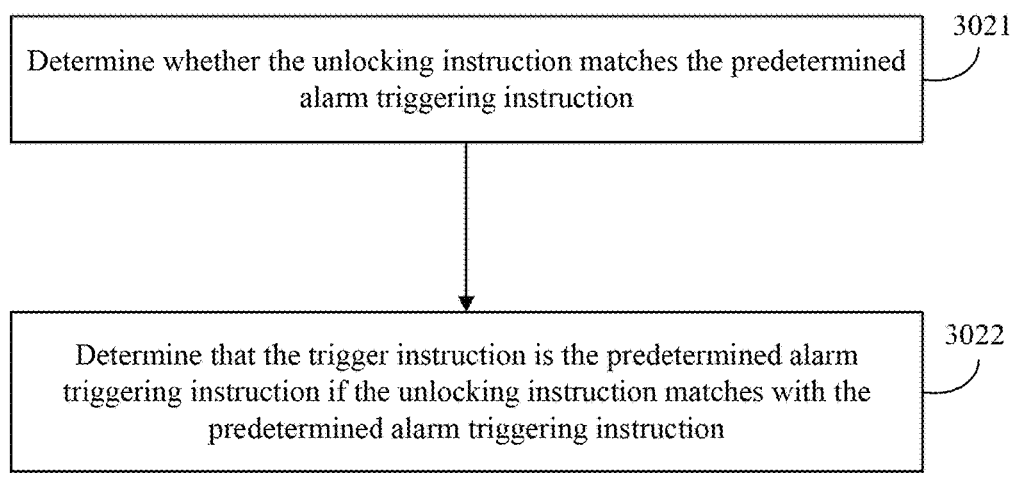
Figure 3:
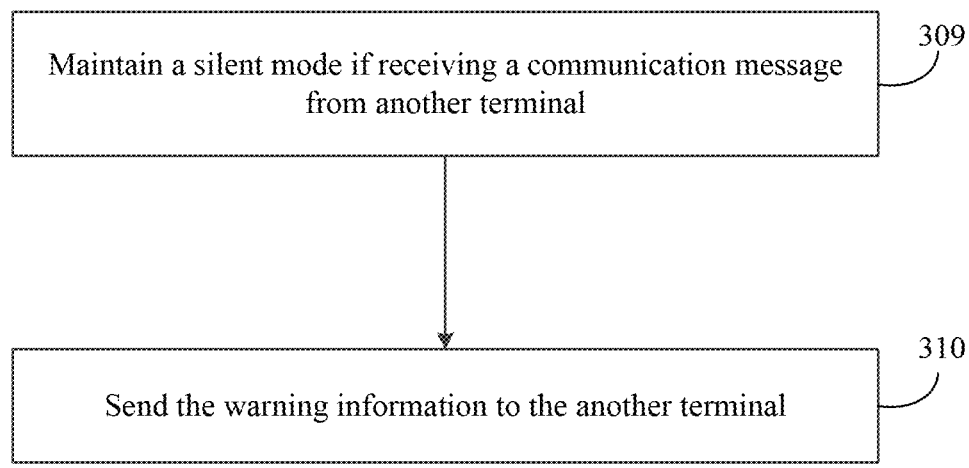

FIG. 3-1 is a flow chart illustrating another method 300 for alarm triggering, according to an exemplary embodiment of the present disclosure. The method 300 can be implemented by the first terminal 120 and may include following steps.

In step 301, a trigger instruction is received on a verification interface.

In some embodiments, the verification interface may be triggered by the first terminal 120 with a predetermined gesture. For example, the verification interface may be a lock screen of the first terminal 120, and the lock screen may be triggered by operating a lock button on the first terminal 120 by the user. The trigger instruction may include any one of a numeric password, gesture information, fingerprint information, and voice information.

The user may verify an identity on the verification interface. The verification interface may be the lock screen, or other predetermined interfaces for triggering the alarm. The user may trigger the first terminal 120 to show the verification interface by a predetermined operation, such as a predetermined gesture operation. For example, if the verification interface is a voice receiving interface, the user may trigger a display of the voice receiving interface by a slide up gesture or a slide down gesture. When the user says a predetermined phrase, such as "call the police," to the voice receiving interface on the first terminal 120, the user can trigger the trigger instruction.

When the user triggers the trigger instruction on the verification interface, the first terminal 120 may receive the trigger instruction on the verification interface. For example, if the verification interface is the lock screen and the trigger instruction includes gesture information, the trigger instruction may include gesture A.

In step 302, it is determined whether the trigger instruction is a predetermined alarm triggering instruction corresponding to at least one contact.

When the first terminal 120 receives a trigger instruction, the first terminal 120 may determine whether the trigger instruction is the predetermined alarm triggering instruction, and the predetermined alarm triggering instruction may include: any one of a predetermined alarm triggering password (such as 1207), predetermined gesture information (such as a slide gesture in the shape of a square), predetermined fingerprint information (such as a thumb fingerprint), or predetermined voice information (such as a phrase "call the police"). The predetermined alarm triggering instruction may correspond to at least one contact. A corresponding relationship between the predetermined alarm triggering instruction and the at least one contact may be stored in the first terminal 120, and at least one predetermined alarm triggering instruction may be stored in the first terminal 120. In some embodiments, because the predetermined alarm triggering instruction may include the predetermined gesture information, the corresponding relationship between the predetermined gesture information and the at least one contact may be stored in the first terminal 120. In some embodiments of the present disclosure, two predetermined alarm triggering instructions can be stored in the first terminal 120 and the predetermined gesture information of the two predetermined alarm triggering instructions may include gestures A and B. The corresponding relationship between the predetermined alarm triggering instruction and the contacts stored in the first terminal 120 can be shown in Table 1 below:

TABLE 1

| predetermined alarm triggering instruction | contact (phone number) | sequence of contacts |
|---|---|---|
| gesture A | Xiao Wang (135****4145) | 1 |
|  | Mao Mao (138****3824) | 2 |
|  | Xiao K (8****3824) | 3 |
|  | Hua Hua (159****0012) | 4 |
| gesture B | Hua Hua (159****0012) | 1 |
|  | 1231 (189****0300) | 2 |

As shown in Table 1, the corresponding relationship between the predetermined gesture information of the predetermined alarm triggering instruction and the at least one contact may be stored in the first terminal 120. Because each predetermined alarm triggering instruction corresponds to at least one contact, each predetermined gesture information may correspond to at least one contact. When the corresponding relationship between the predetermined alarm triggering instruction and the contact is stored by the first terminal 120, the sequence of contacts may also be stored. Moreover, as shown in Table 1, when the corresponding relationship between the predetermined alarm triggering instruction and the contact is stored by the first terminal 120, a corresponding relationship between the predetermined alarm triggering instruction and a phone number of the contact can be stored.

The verification interface can be a lock screen of the first terminal 120, as an example to describe an embodiment of the present disclosure. Receiving the trigger instruction on the verification interface by the first terminal 120 may include: receiving an unlock instruction on the lock screen by the first terminal 120. For example, FIG. 3-2 is a flow chart illustrating a method for determining whether a trigger instruction is a predetermined alarm triggering instruction, according to an exemplary embodiment, and may include following steps.

In sub-step 3021, it is determined whether the unlocking instruction matches the predetermined alarm triggering instruction.

For example, the first terminal 120 may attempt to match the unlocking instruction with the predetermined unlocking instruction. If the unlocking instruction does not match the predetermined unlocking instruction, the first terminal 120 may attempt to match the unlocking instruction with the predetermined alarm triggering instruction.

When the verification interface of the first terminal 120 is the lock screen, the predetermined unlock instruction may be also stored in the first terminal 120. In some embodiments, the predetermined unlock instruction may include any one of a predetermined unlock password, predetermined gesture information, predetermined fingerprint information, and predetermined voice information. Therefore, the predetermined unlock instruction stored in the first terminal 120 may include any one of the predetermined unlock password, the predetermined gesture information, the predetermined fingerprint information, and the predetermined voice information. The predetermined unlock instruction stored in the first terminal 120 may include, for example, predetermined gesture information gesture C and gesture D and predetermined unlock password 1233. Accordingly, the predetermined unlocking instruction stored in the first terminal 120 may be shown in Table 2 below:

TABLE 2

| predetermined unlocking instruction |
| --- |
| gesture C |
| gesture D |
| 1233 |

As shown in Table 2, the predetermined unlocking instruction stored in the first terminal 120 may include predetermined gesture information: gesture C and gesture D, and the predetermined unlock password: 1233. When the unlock instruction (the trigger instruction) is received by the first terminal 120, the first terminal 120 may attempt to match the gesture information of the unlock instruction with the predetermined gesture information of the predetermined unlock instruction. For example, the first terminal 120 may match the gesture A of the unlock instruction with the predetermined gesture information of the predetermined unlock instruction shown in Table 2, for example, by comparing them.

If the unlock instruction does not match the predetermined unlocking instruction, the first terminal 120 may attempt to match the unlocking instruction with the predetermined alarm triggering instruction. As described above, the gesture A of the unlock instruction does not match the predetermined gesture information of the predetermined unlock instruction, and thus the first terminal 120 may attempt to match the gesture A of the unlock instruction with the predetermined gesture information of the predetermined alarm triggering instruction. It can be learned, from the corresponding relationship between the predetermined alarm triggering instruction and the contact stored in Table 1, that the predetermined gesture information of the predetermined alarm triggering instruction stored in the first terminal 120 include gesture A and gesture B. The first terminal 120 may attempt to match the gesture A of the unlock instruction with the gestures A and B of the predetermined alarm triggering instruction.

In sub-step 3022, the trigger instruction is determined to be the predetermined alarm triggering instruction if the unlock instruction matches with the predetermined alarm triggering instruction.

When the unlocking instruction is determined to match the predetermined alarm triggering instruction by the first terminal 120, the trigger instruction can be determined to be the predetermined alarm triggering instruction by the first terminal 120. As shown in sub-step 3021, the gesture A of the unlocking instruction can be matched with the gesture A of the predetermined alarm triggering instruction, and thus the unlock instruction (the trigger instruction) including gesture A can be determined to be the predetermined alarm triggering instruction by the first terminal 120.

Referring back to FIG. 3-1, in step 303, an alarm triggering mode is entered if the trigger instruction is the predetermined alarm triggering instruction, and alarm information is sent to a terminal of the at least one contact, the alarm information indicating that a user, e.g., the user of the first terminal 120, is in danger.

If in step 302, the trigger instruction is determined to be the predetermined alarm triggering instruction by the first terminal 120, the first terminal 120 may enter an alarm triggering mode and the alarm information can be sent to the terminal of the at least one contact. In some embodiments of the present disclosure, the alarm information may include at least information indicating the user in danger or current position information of the user, and the information indicating the user in danger may be predetermined by the user and stored in the first terminal 120 and the current positional information of the user may be obtained by the first terminal 120 in real-time. For example, the alarm information may be "I'm being threatened at place M, help me quickly."

In some embodiments, the alarm information may further include: a recording, a picture, a video, and etc. The recording may be recorded by the first terminal 120 if the trigger instruction is determined to be the predetermined alarm triggering instruction by the first terminal 120, the picture may be taken by the first terminal 120 if the trigger instruction is determined to be the predetermined alarm triggering instruction by the first terminal 120, the video may be obtained by the first terminal 120 if the trigger instruction is determined to be the predetermined alarm triggering instruction by the first terminal 120. In order to quickly trigger the alarm, the first terminal 120 may perform the recording and capture durations in a predetermined duration. The predetermined duration may be set based on practical situations, which is not limited by embodiments of the present disclosure. For example, the predetermined duration can be 5 seconds, i.e., the first terminal 120 may record a 5 second voice clip or film a 5 second video. The first terminal 120 may determine a number of the pictures to take. For example, the first terminal 120 may take one picture. The information of the recording, the picture, and the video may be added in the alarm information to include more evidence into the alarm information.

When the first terminal 120 enters an alarm triggering state, the alarm information may be generated. For example, the first terminal 120 may generate at least the information indicating the user in danger and the current position information of the user, such as "I'm being threatened at place M."

After the first terminal 120 generates the alarm information, the alarm information may be sent to the terminal of the contact. For example, the first terminal 120 may send the alarm information to the terminal of the contact "Xiao Wang," "Mao Mao," "Xiao K," and "Hua Hua" corresponding to gesture A shown in Table 1.

In some embodiments of the present disclosure, the alarm information sent from the first terminal 120 to the terminal of the at least one contact may include following three aspects.

In a first aspect, the first terminal 120 may send a short message including the alarm information to the terminal of the at least one contact.

For example, the first terminal 120 may send the short message to the terminals of the contacts "Xiao Wang," "Mao Mao," "Xiao K," and "Hua Hua" corresponding to gesture A of the predetermined alarm triggering instruction, and the short message may include the alarm information "I'm being threatened at place M".

When the first terminal 120 sends the short message including the alarm information to the terminal of the at least one contact corresponding to gesture A, the short message may be sent to the terminals of the contacts "Xiao Wang," "Mao Mao," "Xiao K," and "Hua Hua" corresponding to gesture A according to the sequence of the contacts stored in Table 1, and the short message may also be sent to the terminals of the above contacts by group texting. For example, the group texting can be used to send the short message including the alarm information, so that the alarm information may be received quickly by each contact corresponding to gesture A, thus improving a distribution efficiency of the alarm information.

In a second aspect, the first terminal 120 may place a call to the terminal of the at least one contact to report the alarm information to the terminal of the contact answering the call.

For example, the first terminal 120 may place a call to the terminal of the at least one contact corresponding to gesture A according to the sequence of the contacts stored in Table 1. For example, the first terminal 120 may call the contact "Xiao Wang" first, and then call the contact "Mao Mao" if the contact "Xiao Wang" does not answer the call, and so on. If at least one contact corresponding to gesture A answers the call, the first terminal 120 may report the alarm information to the terminal of the contact answering the call. For example, if "Xiao Wang" answers the call, the first terminal 120 may report the alarm information "I'm being threatened at place M" to the terminal of the contact "Xiao Wang." If the one who answers the call is not the last one of the at least one contact, the first terminal 120 may continue placing a call to a next contact according to the sequence of the contacts described in Table 1, or the first terminal 120 may place no call to the next contact, which is not limited in embodiments of the present disclosure.

In a third aspect, the first terminal 120 may send the alarm information to the terminal of the at least one contact via a client terminal on the local terminal, the client terminal on the local terminal including at least one of a microblog, a social application, or an email application.

In one embodiment, the client terminal may be installed on the first terminal 120, and the first terminal 120 may send the alarm information to the terminal of the at least one contact by the client terminal. In this case, the first terminal 120 may store the corresponding relationship between the predetermined alarm triggering instruction and an account of the client of the at least one contact. For example, if the client terminal on the first terminal 120 is the email application, the first terminal 120 may store the corresponding relationship between the predetermined alarm triggering instruction and an email address of the at least one contact. If the client terminal on the first terminal 120 is the social application, the first terminal 120 may store the corresponding relationship between the predetermined alarm triggering instruction and an social application account of the at least one contact. For example, if the social application is QQ, the first terminal 120 may store the corresponding relationship between the predetermined alarm triggering instruction and a QQ account of the at least one contact. If the client installed on the first terminal 120 is the microblog, the first terminal 120 may store the corresponding relationship between the predetermined alarm triggering instruction and a microblog account of the at least one contact. In some embodiments, when the first terminal 120 stores the corresponding relationships above, a process may refer to Table 1.

In some embodiments, a signal of the current position of the user of the first terminal 120 may be low, causing a failure in sending the alarm information. In order to improve the success rate of sending the alarm information, the first terminal 120 may send the alarm information to the terminal of the contact at a predetermined time interval. The first terminal 120 may update the alarm information according to the predetermined time interval and send the updated alarm information to the terminal of the at least one contact to ensure that the updated alarm information can be received by the terminal of the at least one contact.

In step 304, the local terminal is turned into a silent mode including at least one of a mute mode or a lock-screen mode.

For example, after the first terminal 120 sends the alarm information, the first terminal 120 may be turned into the silent mode including at least one of the mute mode (i.e., a sound off mode) or the lock-screen mode (i.e., a dark screen mode).

When the first terminal 120 is turned into the silent mode, if an alarm triggering unlock password is not entered, the first terminal 120 may not be used normally, but may receive the communication message from another terminal, preventing someone other than the owner, e.g., a robber, from using the first terminal 120 and preventing a battery drainage of the first terminal 120.

In step 305, at least one of the alarm information or alarm reply information is hidden, the alarm triggering reply information replying the alarm information received by the terminal of the at least one contact.

The first terminal 120 may hide the alarm information after the alarm information has been sent successfully, to prevent someone other than the owner, e.g., a robber, from obtaining the alarm information.

In some embodiments of the present disclosure, after the first terminal 120 sends the alarm information to the terminal of the contact, the terminal may send the reply information to the first terminal 120. For example, the terminal of the contact may include the second terminal 140 shown in FIG. 1, and the second terminal 140 may send the alarm reply information to the first terminal 120. For example, the alarm reply information can be based on the alarm information received by the second terminal 140 from the first terminal 120. The first terminal 120 may receive the alarm reply information sent from the second terminal 140, and the content of the alarm reply information can be determined by the user of the second terminal 140. The second terminal 140 may send the alarm reply information to the first terminal 120 by a short message or a client terminal on the second terminal 140, which is not limited by embodiments of the present disclosure. When the first terminal 120 receives the alarm reply information from the second terminal 140, the first terminal 120 may be in a silent mode and may hide the alarm reply information to prevent someone other than the owner, e.g., a robber, from obtaining the alarm reply information.

For example, by hiding the alarm information, alarm information may not be shown on the information displaying interface (e.g., a short message interface or a social application interface) after the alarm information is sent, and by hiding the alarm reply information, alarm reply information may not be shown on the information displaying interface after the alarm reply information is received. The first terminal 120 may hide the alarm information and the alarm reply information.

As described, an alarm can be triggered discretely when someone is in danger, by hiding the alarm information and/or the alarm reply information.

In step 306, a clear instruction is received on the verification interface.

The user may operate the first terminal 120 to trigger the clear instruction. For example, the user may operate the first terminal 120 to trigger the verification interface by a predetermined gesture, and then trigger the clear instruction on the verification interface, and the first terminal 120 may receive the clear instruction. The clear instruction may include any one of a numeric password, gesture information, fingerprint information, and voice information.

In step 307, it is determined whether the clear instruction is a predetermined alarm clear instruction related to the predetermined alarm triggering instruction.

When the first terminal 120 receives the clear instruction, the first terminal 120 may determine whether the clear instruction is the predetermined alarm clear instruction, in which the predetermined alarm clear instruction is related to the predetermined alarm triggering instruction. That is, the predetermined alarm clear instruction may be the same as or different from the predetermined alarm triggering instruction. For example, the predetermined alarm clear instruction is the same as the predetermined alarm triggering instruction. When the first terminal 120 receives the clear instruction, the first terminal 120 may attempt to match the clear instruction with the predetermined alarm triggering instruction. If the clear instruction is determined to be the same as the predetermined alarm triggering instruction, the clear instruction is determined to be the predetermined alarm clear instruction by the first terminal 120; otherwise, the clear instruction is determined not to be the predetermined alarm clear instruction.

For example, the first terminal 120 determines whether the clear instruction includes gesture A. If the clear instruction includes the gesture A, the clear instruction may be the predetermined alarm clear instruction, and if the clear instruction does not include the gesture A, the clear instruction is not the predetermined alarm triggering clear instruction. If the clear instruction received by the first terminal 120 includes the gesture A, the clear instruction can be determined to be the predetermined alarm clear instruction by the first terminal 120.

In some embodiments, if the predetermined alarm clear instruction is not the same as the predetermined alarm triggering instruction, the first terminal 120 may store the corresponding relationship between the predetermined alarm clear instruction and the predetermined alarm triggering instruction. The first terminal 120 may determine whether the clear instruction is the predetermined alarm clear instruction according to the corresponding relationship between the predetermined alarm clear instruction and the predetermined alarm triggering instruction. The predetermined alarm clear instruction may include any one of a predetermined alarm clear password, a predetermined alarm clear gesture, a predetermined alarm clear fingerprint, and a predetermined alarm clear voice. The corresponding relationship between the predetermined alarm clear instruction and the predetermined alarm instruction stored in the first terminal 120 may be a corresponding relationship between the predetermined alarm clear password and the predetermined gesture information of the predetermined alarm triggering instruction. For example, the corresponding relationship between the predetermined alarm clear instruction and the predetermined alarm triggering instruction stored in the first terminal 120 may be shown in Table 3.

TABLE 3

| predetermined alarm triggering instruction | predetermined alarm clear instruction |
|---|---|
| gesture A | 1314 |
| gesture B | 5210 |

For example, the clear instruction received by the first terminal 120 may include numeric password 1314, as shown in Table 3, the predetermined alarm triggering instruction corresponding to the numeric password 1314 is gesture A, and the clear instruction including the numeric password 1314 is determined to be the predetermined alarm clear instruction by the first terminal 120.

In step 308, the alarm triggering mode is exited if the clear instruction is the predetermined alarm clear instruction.

If in step 308 the first terminal 120 determines that the clear instruction is the predetermined alarm clear instruction, the first terminal 120 may exit the alarm triggering mode. In some embodiments of the present disclosure, because the clear instruction received by the first terminal 120 is the predetermined alarm clear instruction, the first terminal 120 exits the alarm triggering state.

In some embodiments of the present disclosure, the alarm triggering mode can be described with respect to a normal operation mode of the first smart terminal 120. When the first smart terminal 120 is in the alarm triggering state, the alarm information may be sent preferentially and quickly and the mode of the first smart terminal 120 may be switched to at least one of the mute mode or the lock-screen mode to reduce power usage. Moreover, when the first smart terminal 120 is in the alarm triggering state, if the signal of the first terminal 120 is weak, the first terminal 120 may send the alarm information to the terminal of the contact at the predetermined time interval so as to improve a success rate of sending the information.

In some embodiments of the present disclosure, after the first terminal 120 is turned into the silent state, it may receive the communication message sent from another terminal. The communication message may be from the contact of the first terminal 120, or from a public platform, such as news, or a notification. Therefore, as shown in FIG. 3-3, after step 304 of the embodiment shown in FIG. 3-1, the method 300 may further include following steps.

In step 309, a silent mode is maintained if a communication message from another terminal is received.

After the first terminal 120 is turned into the silent state, it may maintain the silent mode even if it receives a communication message from another terminal to reduce power usage.

In step 310, the alarm information is sent to the another terminal.

When the first terminal 120 is in the silent state, if the communication message sent from the another terminal is received, the first terminal 120 may send the alarm information to another terminal. For example, the first terminal 120 may send the alarm information "I'm being threatened at place M" to another terminal.

When communication message sent from another terminal is received, the silent mode is kept and the alarm information is sent to the another terminal, by which it is possible to avoid the waste of an electric quantity and improve the success rate of alarm triggering.

Figures 3, 4:
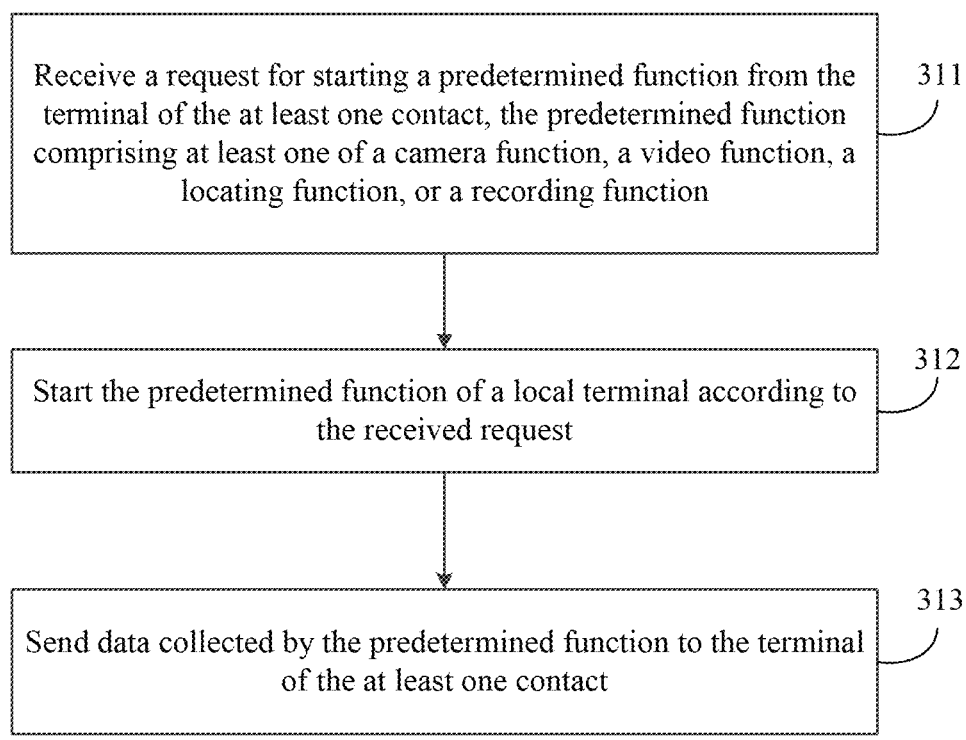
Figure 4:
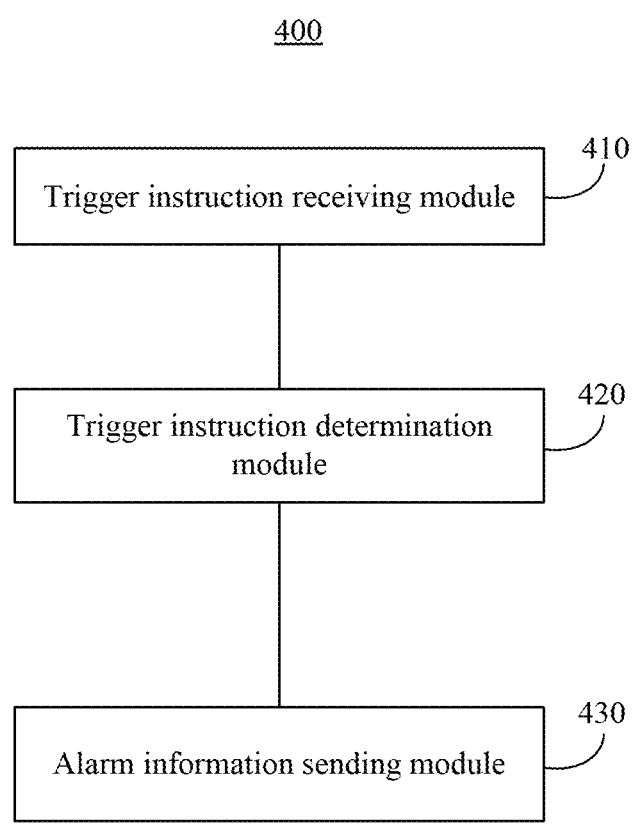

In the second aspect, in some embodiments of the present disclosure, when at least one contact corresponding to the predetermined alarm triggering instruction receives the alarm information sent from the first terminal 120, the alarm information may be verified with the first terminal 120. Therefore, as shown in FIG. 3-4, after step 303 shown in FIG. 3-1, the method 300 may further include following steps.

In step 311, a request for starting a predetermined function from the terminal of the at least one contact is received, and the predetermined function may include at least one of a camera function, a video function, a locating function, or a recording function.

In one embodiment, when the contact corresponding to the predetermined alarm triggering instruction determines that the alarm information sent from the first terminal 120 is not reliable, the contact person may operate the terminal to trigger the request for starting the predetermined function to verify the alarm information. For example, the user of the second terminal 140 is "Xiao Wang" shown in Table 1.

"Xiao Wang" may operate the second terminal 140 to trigger the request for starting the predetermined function. After the second terminal 140 receives the request, it may send the request to the first terminal 120 according to the request, and the first terminal 120 may receive request from the second terminal 140. For example, the predetermined function may include at least one of a camera function, a video function, a locating function, or a recording function. For example, the second terminal 140 may send a request for starting the camera function to the first terminal 120 and the first terminal 120 may receive the request.

In step 312, the predetermined function of a local terminal is started according to the received request.

The first terminal 120 may start the predetermined function of the first terminal 120 according to the received request. For example, the first terminal 120 starts the camera function of the first terminal 120 according to the request for starting the camera function sent from the second terminal 140.

In step 313, data collected by the predetermined function is sent to the terminal of the at least one contact.

After the first terminal 120 starts the predetermined function of the first terminal 120, the data may be collected by the predetermined function of the first terminal 120 and the collected data may be sent to the terminal of the at least one contact. For example, the first terminal 120 starts the camera function of the first terminal 120, a video may be filmed by the video function of the first terminal 120, and the filmed video may be sent to the second terminal 140.

The first terminal 120 may send the collected data to the second terminal 140 by the short message or the client terminal on the first terminal 120, which is not limited by embodiments of the present disclosure.

The method for alarm triggering provided by embodiments of the present disclosure may start the predetermined function according to the request sent from the terminal of the at least one contact, collect data by the predetermined function, and send the collected data to the terminal of the at least one contact to ensure reliability of the alarm information.

The sequence of the steps of the method for alarm triggering provided by embodiments of the present disclosure may be adjusted appropriately and the steps may be added or taken out according to practical situations. For example, the sequence of step 304 and step 305 may be adjusted.

As described, with the method for alarm triggering according to embodiments of the present disclosure, the trigger instruction can be received on the verification interface, an alarm triggering mode can be entered if the trigger instruction is determined to be the predetermined alarm triggering instruction corresponding to at least one contact, and alarm information can be sent to the terminal of the contact. By sending the alarm information to the terminal of the at least one contact, the complicated alarm triggering process described in the related art can be reduced to simplicity.

An embodiment of a device that may be used to perform embodiments of the methods of the present disclosure is described below. Details of embodiment may be referred to embodiments of the methods above.

FIG. 4 is a block diagram illustrating a device 400 for alarm triggering, according to an exemplary embodiment of the present disclosure. The device 400 for alarm triggering may be a part of or the entire first terminal 120 as software, hardware, or a combination of both. The device 400 for alarm triggering may include: a trigger instruction receiving module 410 configured to receive a trigger instruction on a verification interface; a trigger instruction determination module 420 configured to determine whether the trigger instruction received by the trigger instruction receiving module 410 is the predetermined alarm triggering instruction corresponding to at least one contact; an alarm information sending module 430 configured to enter an alarm triggering mode if the trigger instruction received by the trigger instruction receiving module 410 is determined to be the predetermined alarm triggering instruction corresponding to the at least one contact, and to send alarm information to a terminal of the at least one contact, the alarm information indicating that a user is in danger.

As described, with the device for alarm triggering according to embodiments of the present disclosure, the trigger instruction can be received on the verification interface, an alarm triggering mode can be entered if the trigger instruction is the predetermined alarm triggering instruction corresponding to at least one contact, and alarm information can be sent to the terminal of the contact. By sending the alarm information to the terminal of the at least one contact, the complicated alarm triggering process described in the related art can be reduced to simplicity.

Figures 1, 5:
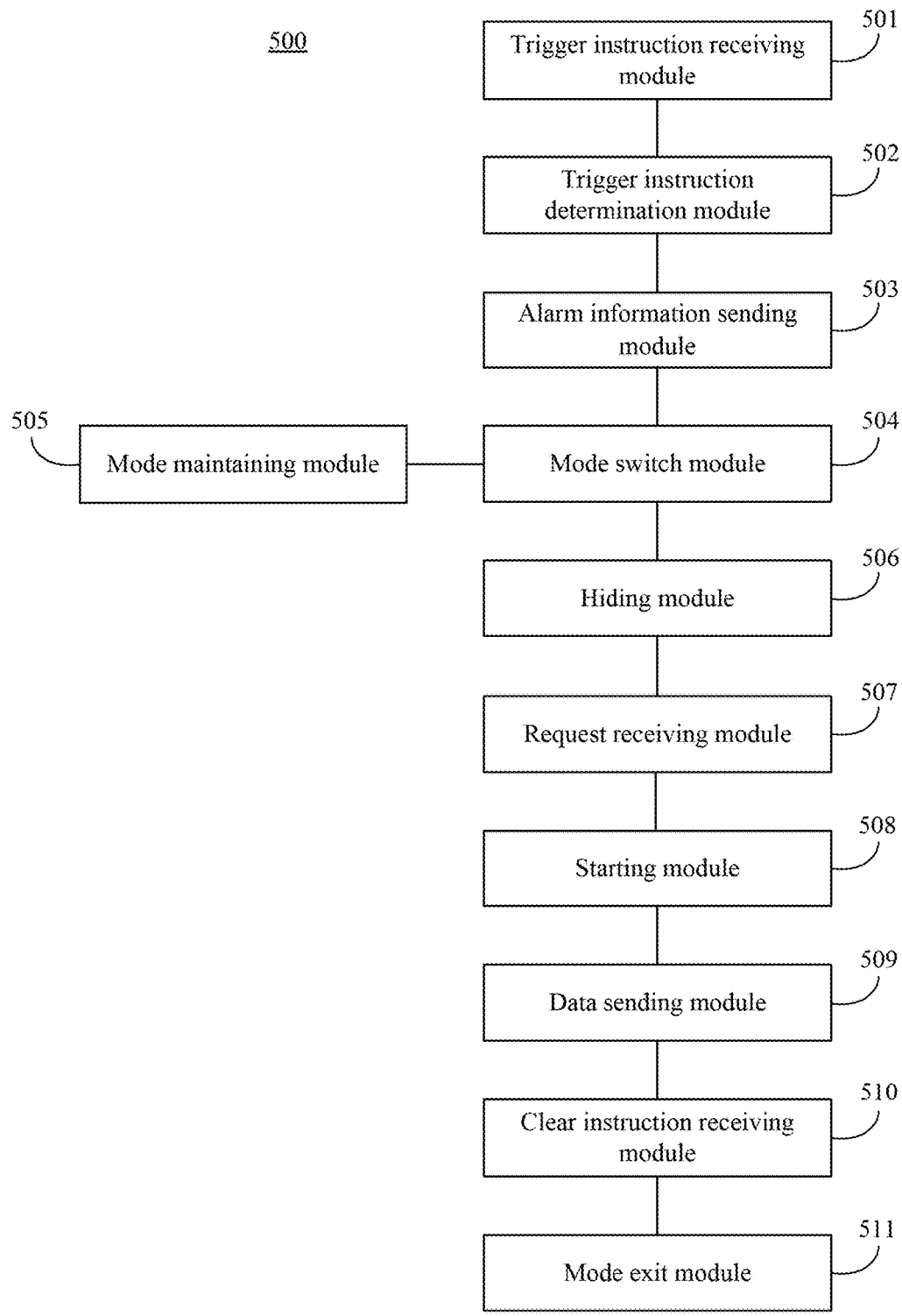
Figures 2, 5:
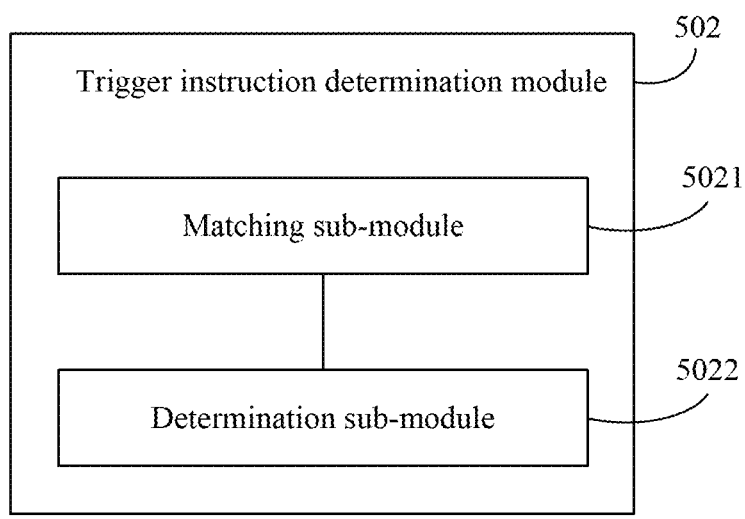

FIG. 5-1 is a block diagram illustrating another device 500 for alarm triggering, according to an exemplary embodiment of the present disclosure. The device 500 may be a part of or the entire first terminal 120 as software, hardware, or a combination of both. The device 400 may include: a trigger instruction receiving module 501 configured to receive a trigger instruction on a verification interface; a trigger instruction determination module 502 configured to determine whether the trigger instruction received by the trigger receiving module 501 is predetermined alarm triggering instruction corresponding to at least one contact; and an alarm information sending module 503 configured to send alarm information to a terminal of the at least one contact, the alarm information indicating that a user is in danger if the trigger instruction received by the trigger instruction receiving module 501 is determined to be the predetermined alarm triggering instruction.

In some embodiments, when the verification interface is a lock screen, the trigger instruction receiving module 501 can be configured to receive an unlock instruction on the lock screen; the device 500 may further include a trigger instruction determination module 502 configured to determine whether the unlock instruction received by the trigger instruction receiving module 501 matches with the predetermined alarm triggering instruction, and determine that the trigger instruction is the predetermined alarm triggering instruction if the unlock instruction matches with the predetermined alarm triggering instruction.

In one embodiment, as illustrated in FIG. 5-2, the trigger instruction determination module 502 may include: a matching sub-module 5021 configured to match the trigger instruction with the predetermined unlock instruction if the verification interface is the lock screen, and to match the trigger instruction with the predetermined alarm triggering instruction if the trigger instruction does not match the predetermined unlock instruction; and a determination sub-module 5022 configured to determine that the trigger instruction received by the trigger instruction receiving module 501 is the predetermined alarm triggering instruction if the trigger instruction received by the trigger instruction receiving module 501 is determined to match the predetermined alarm triggering instruction by the matching sub-module 5021.

The predetermined unlock instruction may allow the terminal to enter a normal working mode. In one embodiment, the terminal can be unlocked if the trigger instruction matches the predetermined unlocking instruction, and can enter the normal working mode. The user may use the terminal in the normal working mode to perform common functions such as communication, browsing, configuring, and entertainment. Referring back to FIG. 5-1, the device 500 may further include: a mode switch module 504 configured to switch a local terminal to a silent mode including at least one of a mute mode or a lock-screen mode.

The device 500 may further include: a mode maintaining module 505 configured to maintain the mode turning module 504 in the silent mode if a communication message is received from another terminal, and the alarm information sending module 503 may be further configured to send the alarm information to the another terminal.

The device 500 for alarm triggering may further include: a hiding module 506 configured to hide at least one of the alarm information or the alarm reply information, wherein the alarm reply information is based on the alarm information after the alarm information is received by the terminal of the at least one contact.

The device 500 for may further include: a request receiving module 507 configured to receive a request for starting a predetermined function from the terminal of the at least one contact, the predetermined function comprising at least one of a camera function, a video function, a locating function, or a recording function; a starting module 508 configured to start the predetermined function of a local terminal according to the request received by the request receiving module 507; and a data sending module 509 configured to send data collected by the predetermined function to the terminal of the at least one contact.

The device 500 for may further include: a clear instruction receiving module 510 configured to receive a clear instruction on the verification interface; a mode exit module 511 configured to exit the alarm triggering mode if the clear instruction received by the clear instruction receiving module 510 is a predetermined alarm clear instruction related to the predetermined alarm triggering instruction.

In one embodiment, the device 500 may further include a module configured to determine whether the clear instruction received by the clear instruction receiving module 510 is the predetermined alarm clear instruction.

In some embodiments, the alarm information sending module 503 may be configured to send the alarm information to the terminal of the at least one in at least one of following three ways: sending a short message comprising the alarm information to the terminal of the at least one contact; placing a call to the terminal of the at least one contact to report the alarm information to a terminal of any one of the at least one contact answering the call; or sending the alarm information to the terminal of the at least one contact via a client terminal on the local terminal, the client terminal on the local terminal comprising at least one of a microblog, a social application, or an email application.

In some embodiments, the alarm information sending module 503 may be configured to send the alarm information to the terminal of the contact at a predetermined time interval, the alarm information comprising danger indicating information and current position information of the user.

As described, with the device for alarm triggering according to embodiments of the present disclosure, the trigger instruction can be received on the verification interface, an alarm triggering mode can be entered if the trigger instruction is the predetermined alarm triggering instruction corresponding to at least one contact, and alarm information can be sent to the terminal of the contact. By sending alarm information to the terminal of the contact corresponding to the predetermined alarm triggering instruction if the trigger instruction is the predetermined alarm triggering instruction, the complicated alarm triggering process described in the related art can be reduced to simplicity.

Figure 6:
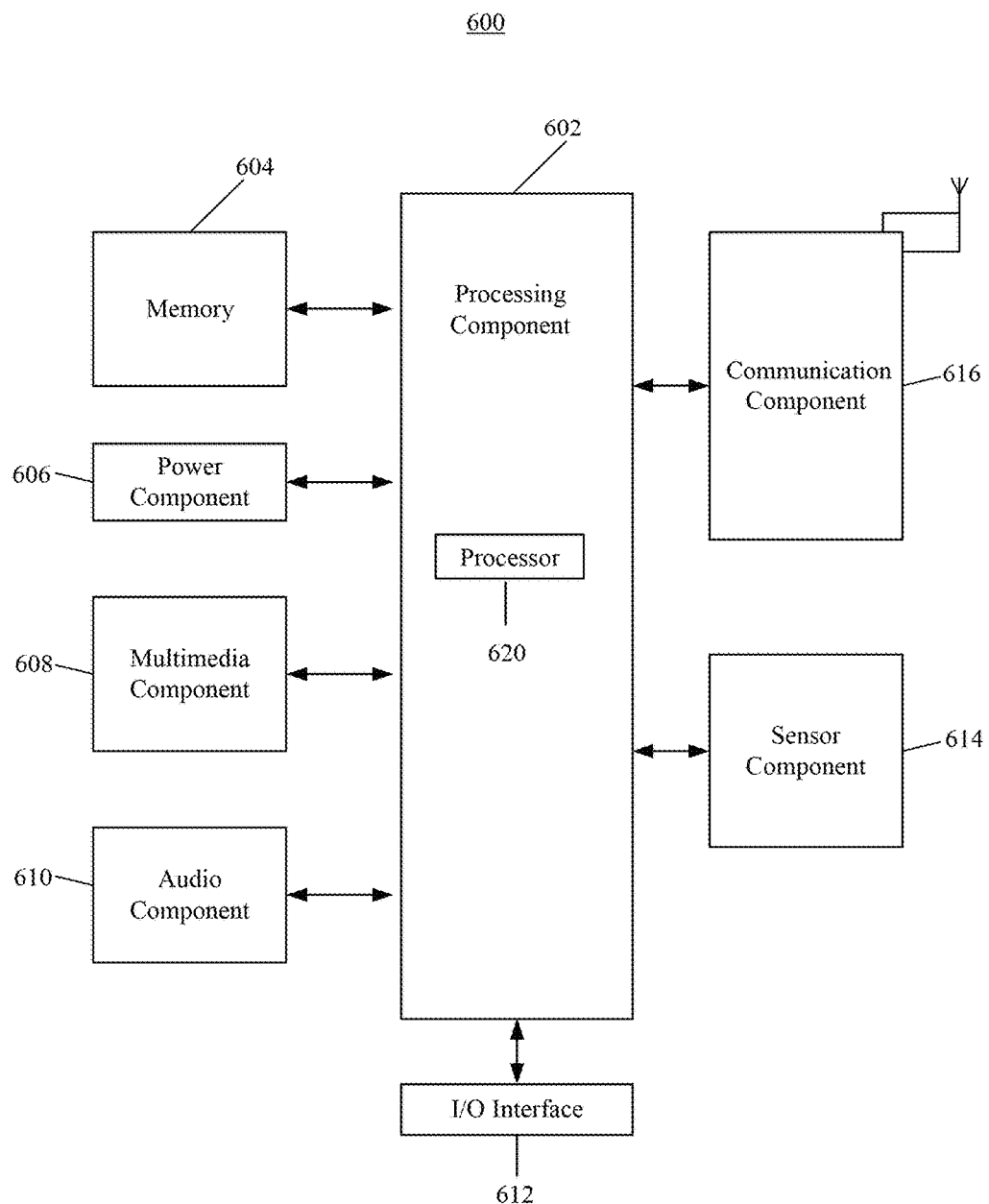
FIG. 6 is a block diagram illustrating a device for alarm triggering, according to an exemplary embodiment.

FIG. 6 is a block diagram illustrating a device 600 for alarm triggering, according to an exemplary embodiment. For example, the device 600 may be a mobile phone, a computer, a digital broadcasting terminal, a messaging device, a game console, a tablet device, fitness equipment, a Personal Digital Assistant (PDA), etc.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 may control overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 may be configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 may provide power to various components of the device 600. The power component 606 may include a power management system, one or more power sources, and any other components associated with the generation, management, and distribution of power in the device 600.

The multimedia component 608 may include a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 608 may include a front camera and/or a rear camera. The front camera and/or the rear camera may receive external multimedia data while the device 600 is in an operation mode, such as a photographing mode or a video mode. Each of the front camera and the rear camera may be a fixed optical lens system or have focus and optical zoom capability.

The audio component 610 may be configured to output and/or input audio signals. For example, the audio component 610 may include a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 may further include a speaker to output audio signals.

The I/O interface 612 may provide an interface for the processing component 602 and peripheral interface modules, such as a keyboard, a click wheel, buttons, and the like. The buttons may include, but are not limited to, a home button, a volume button, a starting button, and a locking button.

The sensor component 614 may include one or more sensors to provide status assessments of various aspects of the device 600. For instance, the sensor component 614 may detect an open/closed status of the device 600 and relative positioning of components (e.g. the display and the keypad of the device 600). The sensor component 614 may also detect a change in position of the device 600 or of a component in the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 may be configured to facilitate wired or wireless communication between the device 600 and other devices. The device 600 can access a wireless network based on a communication standard, such as WIFI, 2G, or 3G, or a combination thereof. In one exemplary embodiment, the communication component 616 may receive a broadcast signal or broadcast associated information from an external broadcast management system via a broadcast channel. In one exemplary embodiment, the communication component 616 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 604 including instructions. The above instructions may be executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium may store instructions that cause the device 600 to perform a method for alarm triggering, when the instructions are executed by the processor of the device 600.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as illustrative only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method for alarm triggering, implemented by a local terminal, comprising:
receiving a trigger instruction on a verification interface;
determining whether the received trigger instruction is a predetermined alarm triggering instruction, the predetermined alarm triggering instruction corresponding to at least one contact stored in a client application installed on the local terminal;
entering an alarm triggering mode if the received trigger instruction is determined to be the predetermined alarm triggering instruction;
sending alarm information to a terminal of the at least one contact, the alarm information indicating that a user is in danger;
turning the local terminal into a silent mode, the silent mode comprising at least one of a mute mode or a lock-screen mode;
maintaining the silent mode if a communication message from another terminal is received; and
sending the alarm information to the another terminal.

2. The method according to claim 1, wherein, when the verification interface is a lock screen, receiving the trigger instruction on the verification interface comprises receiving an unlock instruction on the lock screen; and the method further comprises: determining that the trigger instruction is the predetermined alarm triggering instruction if the unlock instruction matches with the predetermined alarm triggering instruction.

3. The method according to claim 1, further comprising:
hiding at least one of the alarm information or alarm reply information, wherein the alarm reply information is based on the alarm information received by the terminal of the at least one contact.

4. The method according to claim 1, further comprising:
receiving a request for starting a predetermined function from the terminal of the at least one contact, the predetermined function comprising at least one of a camera function, a video function, a locating function, or a recording function;
starting the predetermined function of the local terminal according to the received request; and sending data collected according to the predetermined function to the terminal of the at least one contact.

5. The method according to claim 1, further comprising:
receiving a clear instruction on the verification interface; and
exiting the alarm triggering mode if the clear instruction is a predetermined alarm clear instruction related to the predetermined alarm triggering instruction.

6. The method according to claim 1, wherein sending the alarm information to the terminal of the at least one contact comprises at least one of:
sending a short message comprising the alarm information to the terminal of the at least one contact;
placing a call to the terminal of the at least one contact to report the alarm information to the terminal of the at least one contact answering the call; or
sending the alarm information to the terminal of the at least one contact via a client terminal on a local terminal, the client terminal comprising at least one of a microblog, a social application, or an email application.

7. The method according to claim 1, wherein sending the alarm information to the terminal of the at least one contact comprises:
sending the alarm information to the terminal of the at least one contact at a predetermined time interval, the alarm information comprising information indicating that a user of the local terminal is in danger and current position information of the user.

8. A device for alarm triggering, comprising:
a processor; and
a memory storing instructions executable by the processor,
wherein the processor is configured to:
receive a trigger instruction on a verification interface,
determine whether the received trigger instruction is a predetermined alarm triggering instruction, the predetermined alarm triggering instruction corresponding to at least one contact stored in a client application installed on the device,
enter an alarm triggering mode if the received trigger instruction is determined to be the predetermined alarm triggering instruction,
send alarm information to a terminal of the at least one contact, the alarm information indicating that a user is in danger,
turn the device into a silent mode, the silent mode comprising at least one of a mute mode or a lock-screen mode,
maintain the silent mode if receiving a communication message from another terminal; and
send the alarm information to the another terminal.

9. The device according to claim 8, wherein:
the verification interface is a lock screen;
the processor receives the trigger instruction on the verification interface by receiving an unlock instruction on the lock screen; and
the processor is further configured to determine that the trigger instruction is the predetermined alarm triggering instruction if the unlock instruction matches with the predetermined alarm triggering instruction.

10. The device according to claim 8, wherein the processor is further configured to:
hide at least one of the alarm information and alarm reply information, wherein the alarm reply information is based on the alarm information received by the terminal of the at least one contact.

11. The device according to claim 8, wherein the processor is further configured to:
receive a request for starting a predetermined function from the terminal of the at least one contact, the predetermined function comprising at least one of a camera function, a video function, a locating function, or a recording function;
start the predetermined function of the device according to the received request; and
send data collected according to the predetermined function to the terminal of the at least one contact.

12. The device according to claim 8, wherein the processor is further configured to:
receive a clear instruction on the verification interface; and
exit the alarm triggering mode if the clear instruction is a predetermined alarm clear instruction related to the predetermined alarm triggering instruction.

13. The device according to claim 8, wherein the processor sends the alarm information to the terminal of the at least one contact by at least one of:
sending a short message comprising the alarm information to the terminal of the at least one contact;
placing a call to the terminal of the at least one contact to report the alarm information to the terminal of the at least one contact answering the call; or
sending the alarm information to the terminal of the at least one contact via a client terminal on the device, the client terminal comprising at least one of a microblog, a social application, or an email application.

14. The device according to claim 8, wherein the processor sends the alarm information to the terminal of the at least one contact by:
sending the alarm information to the terminal of the at least one contact at a predetermined time interval, the alarm information comprising information indicating that a user of the device is in danger and current position information of the user.

15. A non-transitory computer-readable storage medium storing instructions that, when executed by a processor of a terminal device, cause the terminal device to perform a method for alarm triggering, the method comprising:
receiving a trigger instruction on a verification interface;
determining whether the received trigger instruction is a predetermined alarm triggering instruction, the predetermined alarm triggering instruction corresponding to at least one contact stored in a client application installed on the terminal device;
entering an alarm triggering mode if the received trigger instruction is determined to be the predetermined alarm triggering instruction;
sending alarm information to a terminal of the at least one contact, the alarm information indicating that a user is in danger;
turning the local terminal into a silent mode, the silent mode comprising at least one of a mute mode or a lock-screen mode;
maintaining the silent mode if a communication message from another terminal is received; and
sending the alarm information to the another terminal.

* * * * *